(No Model.)

C. H. DOUGLAS.
SAW SHARPENER.

No. 603,007. Patented Apr. 26, 1898.

WITNESSES:
C. F. Clemons
N. H. Driggs

INVENTOR
Charles H. Douglas

UNITED STATES PATENT OFFICE.

CHARLES H. DOUGLAS, OF CHICAGO, ILLINOIS.

SAW-SHARPENER.

SPECIFICATION forming part of Letters Patent No. 603,007, dated April 26, 1898.

Application filed May 3, 1897. Serial No. 634,870. (No model.)

*To all whom it may concern:*

Be it known that I, CHARLES H. DOUGLAS, a citizen of the United States, residing at Chicago, in the county of Cook and State of Illinois, have invented certain new and useful Improvements in Saw-Sharpeners; and I do declare the following to be a full, clear, and exact description of the invention, reference being had to the accompanying drawings, and to the letters of reference marked thereon, which form a part of this specification.

My invention relates to an improved machine or implement for sharpening saws, and is especially adapted to that form of teeth that makes a chisel cut and is also designed to give any required angle to the cutting-points of the teeth.

Figure 1:
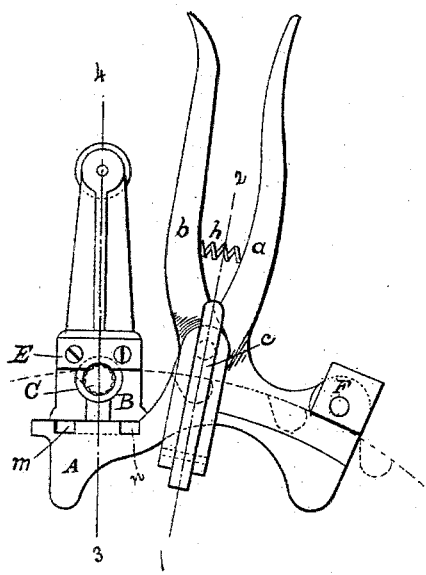
Figure 2:
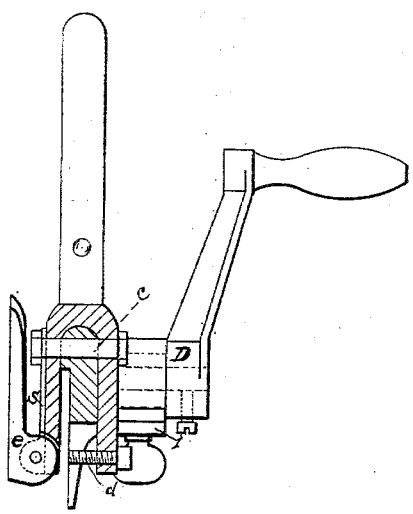
Figure 3:
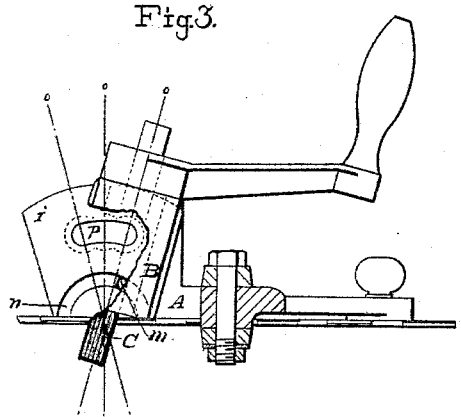
Figure 4:
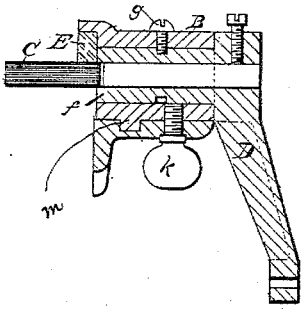

Figure 1 is a view of the implement in position for sharpening the teeth of a circular saw, a few teeth of which are shown in light dotted lines; Fig. 2, a vertical section of the implement on the line 1 2, Fig. 1; Fig. 3, a top view of the same, partly in section and partly broken, with a portion of the edge of a saw to which it is clamped and with the sharpening-cutter standing on an angle of fifteen degrees from a right angle with the saw; and Fig. 4, a section through at 3 4, Fig. 1.

Similar letters refer to similar parts in the different views.

A is a frame, of metal or other suitable material, on which there is a permanent handle $a$.

$b$ is a movable handle which is pivoted to the frame A at $c$ and is bifurcated at its lower end for the purpose of striding the blade of the saw to be sharpened. On one of the forks of the movable handle $b$ is a screw or suitable projection $d$, which rests against the saw-blade. Pivoted upon the other fork, directly opposite screw $d$, there is a cam $e$, which is used for clamping the saw-blade against the screw $d$.

B is a sliding or movable head which forms a socket in which the cutter C is made to revolve to sharpen the teeth of the saw.

D is a crank on which there is a long hub $f$, in which the cutter C is secured. This hub $f$ is made to revolve snugly in the head B and is held in place by a screw which extends into a groove encircling the hub.

Secured to the head B is a plate or piece of hard metal E, which is designed to rest upon the outside or back of the tooth to be sharpened, and the top of cutter C is sufficiently above the bottom of plate E to give the desired angle to the cutting-point of the saw-tooth. This is accomplished, preferably, by letting cutter C into plate E the proper distance.

F is an adjustable plate which rests upon the rear teeth of the saw for the purpose of bringing the sharpening-cutter in proper relation to the tooth to be sharpened. Handles $a$ and $b$ are held apart by spring $h$. Cutter C should be made to revolve sufficiently close to plate E to avoid turning up a bur on the point of the saw-tooth.

To give accuracy and uniformity to the teeth of saws which are sharpened at different angles or with a "flemming" point, the head B is made to slide or be adjusted in a curve from a point near the contact-point of the cutter with the tooth of the saw, as shown by radial lines $o\ o\ o$ in Fig. 3. This brings the cutter in the same relative position on the saw at whatever angle it may be placed, and the distance from the plate F to the part of the cutter which comes in contact with the saw is not changed by setting the head at different angles, as it would be if pivoted to any part of the frame A. This is absolutely necessary in order to do accurate sharpening on flemming teeth with a cutter. I accomplish this by making a curved tongue or projection $m$ on the bottom of head B and a corresponding groove $n$ in the frame or a circular groove in the head and a corresponding tongue in the frame, as seems most convenient.

In Fig. 3 a portion of movable head B is broken away to show part of the curved groove $n$ and an oblong hole P, through which the screw K passes to secure the head B in any desired position.

In operation the tool is placed upon the saw with the plate E resting upon the tooth to be sharpened, with the cutter C at the front or throat. Cam $e$ is then brought down against the saw-blade to tightly clamp it against screw $d$, Fig. 2. Then by pressing the handles $a$ and $b$ toward each other the cutter C is brought against the front of the tooth. Cutter C is then revolved by means of the crank in which it is secured, and the front of the tooth is cut away until it is brought to a sharp cutting-point, after which the tool can be removed to the next tooth by loosening the cam. For sharpening a tooth on an angle the cutter is set on the required angle and all the teeth of a saw that are to be sharpened on that angle are done, after which the cutter is set to the opposite angle to do the opposite ones. In this way a saw can be sharpened at any angle in a very few minutes without removing it from the arbor.

The cam $e$ is pivoted, preferably, to a separate piece of metal $s$, that is secured to the movable handle $b$, which will spring out to accommodate the various thicknesses of saws.

What I claim as my invention, and desire to secure by Letters Patent, is—

1. In a machine for sharpening saws, the combination of a frame adapted to be clamped to a saw, with a sliding head, a milling-tool mounted thereon, said frame and head being provided respectively with a curved tongue and a corresponding curved groove upon their meeting surfaces, and means for clamping said head upon the frame in any required position, substantially as described and for the purpose specified.

2. In a machine for sharpening saws, the combination with a main frame of a cutter C, plate E and movable handle $b$, pivoted to the main frame and provided with a forked end, one fork having a projection or screw $d$, and the other a cam $e$, substantially as specified.

3. In a device of the character specified, the combination with a frame, and means for clamping the same to the saw, of a milling-cutter, its shaft, means for rotating said shaft, the head in which said shaft is journaled, and means for securing said head to the frame, said means being constructed and arranged so that the shaft may be set at any desired angle to the face of the saw, and so that the cutter will remain in the same relative position on the saw at whatever angle the shaft may be set, substantially as described.

In witness whereof I affix my signature in the presence of witnesses.

CHARLES H. DOUGLAS.

Witnesses:
C. F. CLEMONS,
W. H. DRIGGS.